US006865228B2

(12) United States Patent
Otaka et al.

(10) Patent No.: US 6,865,228 B2
(45) Date of Patent: Mar. 8, 2005

(54) DIGITAL DATA TRANSMISSION APPARATUS AND METHOD FOR MULTIPLEXING MULTIPLEXING MULTI-CHANNEL VIDEO DATA WITHIN ACTIVE VIDEO PERIODS

(75) Inventors: Hideki Otaka, Neyagawa (JP); Takayasu Yoshida, Toyono-gun (JP); Hidefumi Muraoka, Settu (JP); Yukio Nakagawa, Moriguchi (JP); Kazuma Morishige, Hirakata (JP); Shinya Tanaka, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/144,898

(22) Filed: May 14, 2002

(65) Prior Publication Data

US 2002/0131508 A1 Sep. 19, 2002

Related U.S. Application Data

(62) Division of application No. 09/230,662, filed as application No. PCT/JP98/02739 on Jun. 19, 1998, now abandoned.

(30) Foreign Application Priority Data

Jun. 20, 1997 (JP) ..................................... HEI 9-163940

(51) Int. Cl.[7] .................................................. H04N 7/12
(52) U.S. Cl. ................................................. 375/240.26
(58) Field of Search ..................... 375/240.01, 240.26, 375/240.27, 240.28; 386/33, 95, 98, 112; H04N 7/12

(56) References Cited

U.S. PATENT DOCUMENTS

| | | | |
|---|---|---|---|
| 4,302,629 A | 11/1981 | Foulkes et al. | |
| 4,638,380 A | 1/1987 | Wilkinson et al. | |
| 4,737,863 A | 4/1988 | Eto et al. | |
| 4,745,486 A | 5/1988 | Ohira et al. | |
| 4,910,605 A | 3/1990 | Sasaki et al. | |
| 5,384,670 A | 1/1995 | Gillard et al. | |
| 5,387,941 A | 2/1995 | Montgomery et al. | |
| 5,579,181 A | 11/1996 | Wilkinson et al. | |
| 5,699,360 A | 12/1997 | Nishida et al. | |

FOREIGN PATENT DOCUMENTS

| | | |
|---|---|---|
| EP | 0 667 715 A2 | 8/1995 |
| EP | 0 691 648 A1 | 1/1996 |
| JP | 51-019293 B | 6/1976 |
| JP | 7-30923 | 1/1995 |
| JP | 07-226022 A | 8/1995 |
| JP | 07-230669 A | 8/1995 |
| JP | 07-327227 A | 12/1995 |
| JP | 8-18914 | 1/1996 |
| JP | 09-046705 A | 2/1997 |
| JP | 09-046705 A1 | 2/1997 |
| JP | 8-223548 | 12/1997 |
| JP | 10-174064 | 6/1998 |

OTHER PUBLICATIONS

"Proposed SMPTE Standard for Television–Data Structure for DV–Based Audio, Data and Compressed Video–25 and 50 Mb/s", *SMPTE Journal*, SMPTE, Inc. vol. 108, No. 5 (May, 1999).

*Primary Examiner*—Young Lee
(74) *Attorney, Agent, or Firm*—Akin Gump Strauss Hauer & Feld, LLP

(57) ABSTRACT

A digital data transmission apparatus and a transmission method thereof in accordance with the present invention includes a reproduction section for reproducing digital data of n (n is an integer of 2 or more) channels from a recording medium, a multiplexing section for dividing one frame in a television signal into n transmission areas on a line-by-line basis, and multiplexing digital data of the n channels reproduced by the reproduction section on the n corresponding transmission areas on the line-by-line basis, and a transmitting section for transmitting data multiplexed by the multiplexing section.

8 Claims, 16 Drawing Sheets

FIG. 15   *PRIOR ART*

Transmission order →

| H0 | SC0 | SC1 | VA0 | VA1 | VA2 | | | | | | | | | | |
|---|---|---|---|---|---|---|---|---|---|---|---|---|---|---|---|
| A0 | V0 | V1 | V2 | V3 | V4 | V5 | V6 | V7 | V8 | V9 | V10 | V11 | V12 | V13 | V14 |
| A1 | V15 | V16 | V17 | V18 | V19 | V20 | V21 | V22 | V23 | V24 | V25 | V26 | V27 | V28 | V29 |
| A2 | V30 | V31 | V32 | V33 | V34 | V35 | V36 | V37 | V38 | V39 | V40 | V41 | V42 | V43 | V44 |
| A3 | V45 | V46 | V47 | V48 | V49 | V50 | V51 | V52 | V53 | V54 | V55 | V56 | V57 | V58 | V59 |
| A4 | V60 | V61 | V62 | V63 | V64 | V65 | V66 | V67 | V68 | V69 | V70 | V71 | V72 | V73 | V74 |
| A5 | V75 | V76 | V77 | V78 | V79 | V80 | V81 | V82 | V83 | V84 | V85 | V86 | V87 | V88 | V89 |
| A6 | V90 | V91 | V92 | V93 | V94 | V95 | V96 | V97 | V98 | V99 | V100 | V101 | V102 | V103 | V104 |
| A7 | V105 | V106 | V107 | V108 | V109 | V110 | V111 | V112 | V113 | V114 | V115 | V116 | V117 | V118 | V119 |
| A8 | V120 | V121 | V122 | V123 | V124 | V125 | V126 | V127 | V128 | V129 | V130 | V131 | V132 | V133 | V134 |

H : Header DIF block
SC: Sub-code DIF block
VA: VAUX DIF block
A : Audio DIF block
V : Video DIF block

FIG. 16

*PRIOR ART*

| | Sub-channel A | Sub-channel B | | | | | |
|---|---|---|---|---|---|---|---|
| | H₀,A | H₀,B | SC₀,A | SC₀,B | SC₁,A | SC₁,B | VA₀,A | VA₀,B |
| | VA₁,A | VA₁,B | VA₂,A | VA₂,B | A₀,A | A₀,B | V₀,A | V₀,B |
| | V₁,A | V₁,B | V₂,A | V₂,B | V₃,A | V₃,B | V₄,A | V₄,B |
| | V₅,A | V₅,B | V₆,A | V₆,B | V₇,A | V₇,B | V₈,A | V₈,B |
| | V₉,A | V₉,B | V₁₀,A | V₁₀,B | V₁₁,A | V₁₁,B | V₁₂,A | V₁₂,B |
| | ... | ... | ... | ... | ... | ... | ... | ... |
| | V₁₂₇,A | V₁₂₇,B | V₁₂₈,A | V₁₂₈,B | V₁₂₉,A | V₁₂₉,B | V₁₃₀,A | V₁₃₀,B |
| | V₁₃₁,A | V₁₃₁,B | V₁₃₂,A | V₁₃₂,B | V₁₃₃,A | V₁₃₃,B | V₁₃₄,A | V₁₃₄,B |

→ Transmission order

H : Header DIF block
SC: Sub-code DIF block
VA: VAUX DIF block
A : Audio DIF block
V : Video DIF block

DIGITAL DATA TRANSMISSION APPARATUS AND METHOD FOR MULTIPLEXING MULTIPLEXING MULTI-CHANNEL VIDEO DATA WITHIN ACTIVE VIDEO PERIODS

CROSS-REFERENCE TO RELATED APPLICATION

This application is a division of U.S. application Ser. No. 09/230,662 filed May 20, 1999 now abandoned, which is a 371 of PCT/JP98/02739 filed Jun. 19, 1998.

FIELD OF THE INVENTION

The present invention relates to a digital data transmission apparatus for multiplexing and transmitting digital data including video data and audio data, and a transmission method thereof. More particularly, the present invention relates to a digital data transmission apparatus for multiplexing and transmitting the digital data in an active video period of a television signal, and a transmission method thereof.

BACKGROUND ART

At present, there is generally employed the SMPTE-259M standard, i.e., Serial Digital Interface (below, referred to as "SDI") standard as transmission method of digital video signals in broadcasting stations of all the countries in the world. It is known that the SDI standard is prescribed by the SMPTE (Society of Motion Picture and Television Engineers), and provides that digital data including video data and audio data are converted into serial data to be transmitted.

Referring to FIG. 13, a concrete description will be given to a digital data transmission method under the above-described known SDI standard. It is noted that a description will be given to a transmission method corresponding to television signals of the NTSC system in the following description.

FIG. 13 is an explanatory diagram showing a configuration of one frame in the SDI standard. It is noted that a straight line H of FIG. 13 represents a horizontal pixels of a television signal, and each numeric value on the straight line H represents a pixel number. A straight line V of the same figure represents a vertical line of a television signal, and each numeric value on the straight line V represents a line number.

As shown in FIG. 13, in the SDI standard, one frame period is divided into a horizontal blanking period, and a vertical blanking period, an optional blanking period and an active video period in each field of a first field and a second field constituting the one frame.

The horizontal blanking period is prescribed by the section of horizontal pixels of which the pixel numbers range from 1440 to 1715. The horizontal blanking period is provided with EAV (End of Active Video) and SAV (Start of Active Video) on its top portion and end portion, respectively. In the horizontal blanking period between the EAV and SAV, ancillary data such as audio data and user data can be transmitted.

In the active video period, video data of 1440 pixels are multiplexed on every line to be transmitted as the serial data by a predetermined clock frequency. It is noted that one pixel is comprised of 8 bits or 10 bits of video data.

The optional blanking period is a period which is included in the vertical blanking period. However, the optional blanking period can arrange and transmit video data in the same manner as in the active video period.

The use of the SDI standard enables the transmission of 4:2:2-component television signals of one channel not through analog transmission system, ensuring the prevention of degradation in the signals.

On the other hand, in the case where the video data obtained from digitization of video signals were processed as they were, the video data were increased in amount of data, so that the video data were required very high data rate (transmission rate). Accordingly, when the above-described video data were recorded on a recording medium such as magnetic tape, it was impossible to ensure a sufficient recording time.

In contrast, the handling of the video data by performing compression thereof in such manner that visual image degradation is not recognized by bit rate reduction has been known as effective technique. Concretely, there is a DV format prescribed by the HD digital VCR Committee (High Definition Video Cassette Reorder Committee), and described in "Specifications of Consumer-Use Digital VCRs using 6.3 mm magnetic tape" as the one in which the bit rate reduction of a video signal is applied to a home digital VTR.

In the DV format, data compression is performed in two modes according to television signals by means of bit rate reduction based on DCT (Discrete Cosine Transform). Concretely, in the DV format, a standard television signal is compressed to 25 Mbps data, while a high-definition television signal is compressed to 50 Mbps data. The compressed video data are recorded on the magnetic tape with interleaved audio data, VAUX data which are data ancillary to the video data, AAUX data which are data ancillary to the audio data, and sub-code data and the like. In the case where the data compressed in the 25 Mbps mode are recorded on the magnetic tape, the data for one frame are divided into 10 tracks of the magnetic tape to be recorded. Also, in the case where the data compressed in the 50 Mbps mode are recorded on the magnetic tape, the data for one frame are divided into 20 tracks of the magnetic tape to be recorded. It is noted that, as for the concrete information the above-described VAUX data, AAUX data and sub-code data show, it is described in, for example, the technology of "digital recording and reproducing apparatus" disclosed in Japanese Laid-Open Patent Publication No. 7-226022.

When the video data compressed by the bit rate reduction such as the DV format are transmitted using the above-described SDI standard, in the prior art, the compression of the video data has been required to be once decompressed back into a base band signal. Because in the SDI standard, there is prescribed the transmission method of not the compressed video data but the non-compressed video data which have not been compressed. Further, the SDI standard is intended to transmit the video data of the one channel, and hence it has no provisions for the transmission method for transmitting multi-channel video data. For this reason, for example, transmission of compressed multi-channel video data between recording and reproducing apparatuses by the use of the SDI standard has required that a transmission line was provided for every channel, and further that at least a decoder and an encoder were provided at the transmission line on the transmitting side and the receiving side, respectively.

Examples of a conventional digital data transmission method to overcome the forgoing problems include the technology of "digital data transmission method" disclosed in Japanese Laid-Open Patent Publication No. Hei 9-46705.

The object of the conventional digital data transmission method is to transmit multi-channel video signals compressed by, for example, the DV format, utilizing the existing transmission lines comprised of coaxial cables.

Here, a concrete description will be given to a conventional digital data transmission method with reference to FIG. 14.

FIG. 14 is an explanatory diagram showing a method for multiplexing and transmitting digital data of six channels using the SDI standard in a conventional digital data transmission method.

As shown in FIG. 14, in the conventional digital data transmission method, the active video period is divided into units of 240 pixels (words), so that six transmission areas are formed on the SDI standard. Six channels 1, 2, 3, 4, 5, and 6 are assigned to the six transmission areas, respectively. In each of the channels 1 through 6, digital interface data (below, referred to as "DIF data") for the one frame are arranged. Specifically, the DIF data are comprised of a plurality of a DIF block, and the DIF data are arranged in the transmission area so that three DIF blocks are multiplexed on every line. The DIF data are also comprised of the video data compressed to the 25 Mbps based on the DV format, the interleaved audio data, the VAUX data, the AUUX data and the sub-code data.

With the conventional digital data transmission method, in the case where the data compression is performed in the 25 Mbps mode as shown in the same figure, it is possible to multiplex the DIF data up to a maximum of the six channels of the channels 1 through 6 and transmit them on the SDI standard. Also, in the case where the data compression is performed in the 50 Mbps mode, two transmission areas can be assigned per one channel to multiplex the DIF data and transmit them on the SDI standard.

The DIF data for the one frame are comprised of a plurality of a DIF sequence. The DIF sequence is a transmission unit defined by the DV format. In the case of the 25 Mbps mode, one DIF sequence corresponds to one track on the magnetic tape. Also, in the case of the 50 Mbps mode, the one DIF sequence corresponds to two tracks of the magnetic tape.

A concrete description will be given to the transmission order of the DIF blocks constituting the DIF sequence with reference to FIGS. 15 and 16.

FIG. 15 is an explanatory diagram showing a concrete example of the transmission order of DIF blocks in the case of a 25 Mbps mode. FIG. 16 is an explanatory diagram showing a concrete example of the transmission order of the DIF blocks in the case of a 50 Mbps mode. Each transmission order of the DIF blocks shown in FIGS. 15 and 16 is the same one as that described in the technology of the foregoing Japanese Laid-Open Patent Publication No. Hei 7-26022.

As shown in FIG. 15, in the case of the 25 Mbps mode, the DIF sequence has a header DIF block H0, sub-code DIF blocks SC0 and SC1, VAUX DIF blocks VA0 to VA2, audio DIF blocks A0 to A8, and video DIF blocks V0 to V134. These DIF blocks are, as shown in the same figure, sequentially transmitted in the order of transmission shown by an arrow of the figure. Each the DIF has 80 bytes of data.

Next, in the case of the 50 Mbps mode, processing is performed by using the processing system in the 25 Mbps mode in two-system parallel. That is, data of the odd-numbered tracks of 20 tracks corresponding to data for one frame are processed by the one processing system, while data of the even-numbered tracks are processed by the other processing system. Hereinafter, the data corresponding to the odd-numbered tracks are defined as sub-channel A, while the data corresponding to the even-numbered tracks are defined as sub-channel B.

Specifically, first, in the data processing of the video signals in the 50 Mbps mode, the one frame is divided into two areas. Then, the data of the one area are processed as data of the sub-channel A, while the data of the other area are processed as data of the sub-channel B. Therefore, in the video signals, the bit rate reduction encoding and decoding processing are performed independently in each of the sub-channels A and B. Also, in the audio signals, 1 and 3 channels of four channels are divided into the sub-channel A, while 2 and 4 channels are divided into the sub-channel B, thus performing processing.

Subsequently, in the case of the 50 Mbps mode, after data processing is performed between the sub-channels A and B as described above, as shown in FIG. 16, the respective DIF blocks of the sub-channels A and B are arranged alternately, and thus multiplexed, thereby performing a sequential transmission by the order of transmission shown by an arrow of the figure.

However, in the foregoing conventional digital data transmission method, as shown in FIG. 14, the DIF blocks of each channel are multiplexed and transmitted sequentially three by three within one line. Accordingly, in this conventional digital data transmission method, in the case where data of a plurality of channels are transmitted, each data of a plurality of channels is sent out from the transmitting side to the receiving side of a transmission path with being mutually mixed within one line. Consequently, in the conventional digital data transmission method, data cannot be processed in the order inputted in the receiving side of the transmission path. This requires, for example, that the received data be held until the data for one frame has been input.

Concretely, the case is conceivable where data are transmitted at high speed from a digital data recording and reproducing apparatus as application for transmitting the digital data of a plurality of channels including the video signals subjected to the bit rate reduction through a digital interface. That is, the data is reproduced from the recording medium at high speed such as 4 times normal speed. Then, the data of four channels are multiplexed and transmitted on the transmission path in accordance with the above-described SDI standard and the like. This enables a reduction of time required for data transmission down to ¼. In this case, with the video signals of the same material, data of four chronologically consecutive frames are multiplexed and transmitted in the active video period of the one frame as data of four channels, respectively. However, in the conventional digital data transmission method, the data of the four frames are not arranged in the chronological order on the transmission path. Accordingly, in an apparatus of the receiving side for receiving data transmitted at high speed such as recording and reproducing apparatus, there has arisen a problem that data processing cannot be performed in the order inputted.

Further, in a system for transmitting data of a plurality of different materials simultaneously, the use of conventional digital data transmission method cannot enable the multiplexing and distribution of, for example, a plurality of data reproduced from their respective different recording and reproducing apparatuses on a digital interface. This is because as shown in FIG. 14; in the conventional digital data transmission method, the data of each channel are multiplexed within one line. Further, the data of each channel are arranged over a plurality of lines, and two fields. For this reason, the multiplexing and distribution of a plurality of data cannot be performed on a line-by-line basis, or on a field-by-field basis using the conventional digital data transmission method.

Further, in the conventional digital data transmission method, as shown in FIGS. 15 and 16, the arrangement of data within the channel is changed in accordance with the data rate of the data to be transmitted. For example, in the case of the above-described 50 Mbps, the data are transmitted using the same transmission area as that in the case of two channels in the 25 Mbps mode. However, in the conventional digital data transmission method, the arrangement of data within the transmission area, that is, the method of multiplexing of data has been changed between the case of the 50 Mbps mode and the case of two channels in the 25 Mbps mode. Consequently, in the conventional digital data transmission method, an increase in kind of multiplexing has required an increase in size of a data multiplexing circuits, and switching of control in accordance with the contents of data to be handled. Especially, in the apparatus on the receiving side, it has been very difficult to change data distribution process according to the contents of the received data and the data rate in real time.

BRIEF SUMMARY OF THE INVENTION

Briefly the present invention is a digital data transmission apparatus for multiplexing and transmitting compressed digital video data of n channels within active video periods of one frame of a television signal where n is an integer of 2 or more. The digital data transmission apparatus comprises: a reproduction means for reproducing the digital video data of said n channels from a recording medium; a multiplexing means for:(1) dividing said active video periods of one frame of the television signal into n transmission areas, each of the n transmission areas comprising m consecutive lines, m being a positive integer, (2) packetizing the reproduced compressed digital video data of each of the n channels into a plurality of packets having a packet header including a packet ID, and (3) arranging the packets of the reproduced compressed digital video data of each of said n channels within one of said n transmission areas wherein said m consecutive lines comprise the compressed digital video data of one and only one of said n channels; and a transmitting means for transmitting the packets arranged by said multiplexing means within each of the n transmission areas, serially from a top line to a bottom line of each of the transmission areas.

Another aspect of the present invention comprises a digital data transmission method for multiplexing and transmitting compressed digital video data of n channels within an active video period of one frame of a television signal, where n is an integer of 2 or more, the digital data transmission method comprising the steps of: dividing said active video period of one frame of the television signal into n transmission areas, each of then transmission areas comprising m consecutive lines, m being a positive integer, of said one frame of the television signal; assembling the compressed digital video data of each of the n channels into a plurality of packets, each of the packets having a packet header including a packet ID; arranging the packets of the compressed digital video data of each of said n channels within one of said n transmission areas wherein said m consecutive lines comprise the compressed digital video data of one and only one of said n channels; and transmitting the packets arranged within each of then transmission areas serially from a top line to a bottom line of each of the transmission areas.

BRIEF DESCRIPTION OF DRAWINGS

FIG. 15 is an explanatory diagram showing a concrete example of the transmission order of DIF blocks in the case of a 25 Mbps mode.

FIG. 16 is an explanatory diagram showing a concrete example of the transmission order of the DIF blocks in the case of a 50 Mbps mode.

It will be recognized that some or all of the Figures are schematic representations for purposes of illustration and do not necessarily depict the actual relative sizes or locations of the elements shown.

BEST MODE FOR CARRYING OUT THE INVENTION

Hereinafter, preferred embodiments of a digital data transmission apparatus and a transmission method thereof in accordance with the present invention will be described with reference to the accompanying drawings.

<<First Embodiment>>

Figure 1:
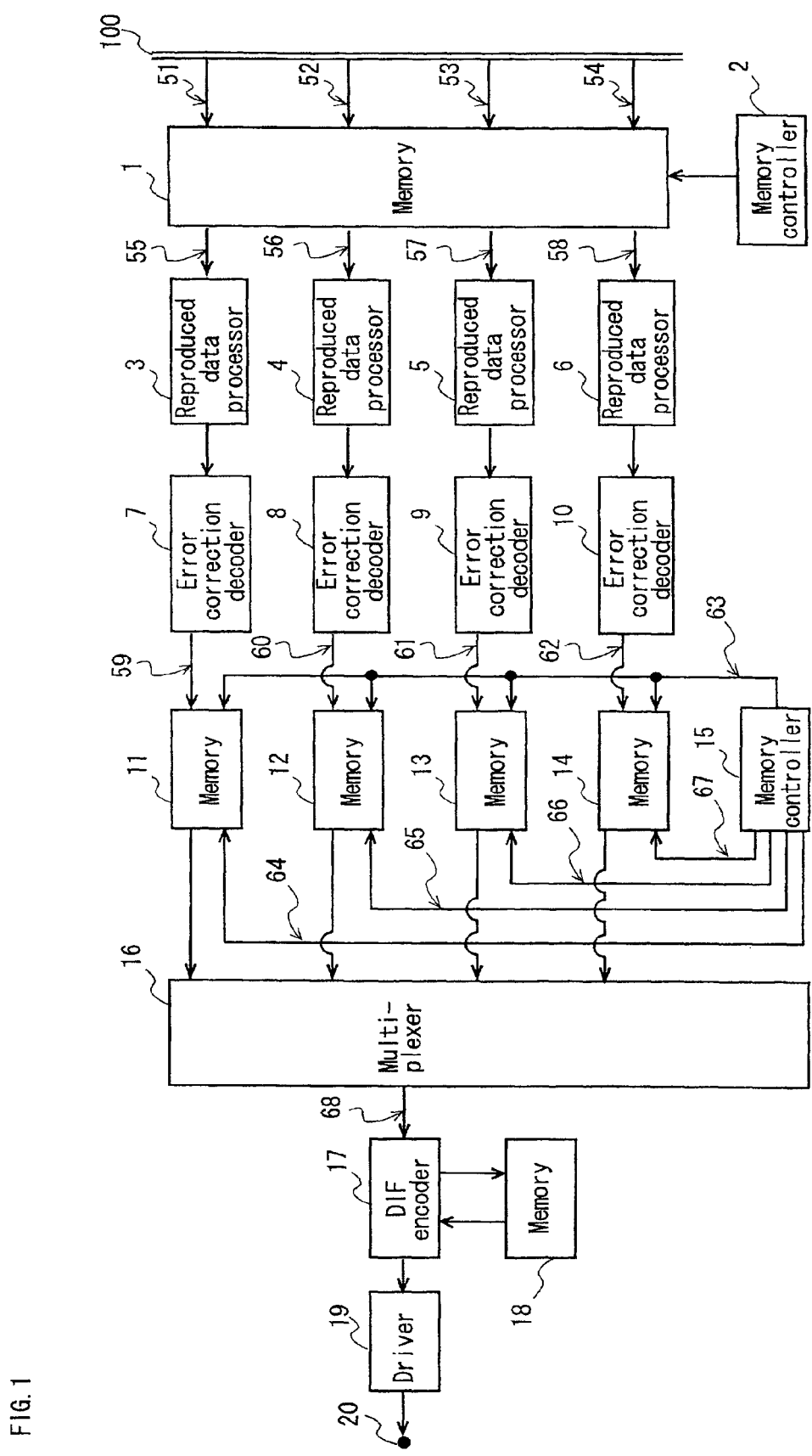
FIG. 1 is a block diagram showing a configuration of a digital data transmission apparatus in a first embodiment of the present invention.

FIG. 1 is a block diagram showing a configuration of a digital data transmission apparatus in a first embodiment of the present invention. It is noted that, in the following description, a digital data transmission apparatus for transmitting data at high speed such as 4 times normal speed will be described in order to facilitate the comparison with conventional examples. Further, in the following description, the configuration will be described in which data reproduced at 4 times normal speed are converted to the above-described DIF data, and multiplexed and output in an active video period of one frame on the SDI standard. Moreover, it is assumed that the data are compressed by a data rate of 25 Mbps on a frame-by-frame basis based on the DV format, and recorded on a magnetic tape. Also, a description will now be given to the case where the data are read in parallel from the magnetic tape using four heads, and the feed speed of the magnetic tape is set to be four times that at the time of normal reproduction, thereby to conduct data reproduction at the 4 times normal speed.

As shown in FIG. 1, the digital transmission apparatus of this embodiment includes a memory 1 for rearranging serial reproduced data 51, 52, 53, and 54 simultaneously reproduced from a magnetic tape 100 by four heads not shown into data on the frame-by-frame basis, and a memory controller 2 for controlling the memory 1. Further, the digital data transmission apparatus of this embodiment includes reproduced data processors 3, 4, 5, and 6 for performing demodulation processing reproduced data 55, 56, 57, and 58 which have been input from the memory 1, and rearranged on the frame-by-frame basis respectively, and error correction decoders 7, 8, 9, and 10 connected to the respective reproduced data processors 3 to 6 and for performing the error correction decoding processing of the input reproduced data, respectively. The error correction decoders 7 to 10 perform the error correction decoding processing of the reproduced data input from the respective reproduced data processors 3 to 6 based on each parity added at the time of recording, respectively. Then, the error correction decoders 7 to 10 output DIF data 59, 60, 61, and 62 each including compressed video data, audio data, VAUX data, AAUX data, and sub-code data, respectively.

In the digital data transmission apparatus of this embodiment, the aforementioned memory 1, memory controller 2, reproduced data processors 3 to 6, and error correction decoders 7 to 10 configure a reproduction means for reproducing digital data of n (n is an integer of 2 or more) channels from a recording medium.

Further, the digital data transmission apparatus of this embodiment includes memories 11, 12, 13, and 14 connected to the respective error correction decoders 7 to 10, a memory controller 15 for controlling the memories 11 to 14, and a multiplexer 16 connected to the memories 11 to 14. The memories 11 to 14 write and hold the respective DIF data 59 to 62 based on a write control signal 63 from the memory controller 15. Also, the memories 11 to 14 read the respective holding DIF data 59 to 62 based on read control signals 64, 65, 66, and 67 from the memory controller 15, and output them to the multiplexer 16, respectively. Thereby, the DIF data 59 to 62 undergo shift of their time axis in the transmission order from one another, and are output as multiplexed DIF data 68 from the multiplexer 16 (a detail description thereon is below).

The digital data transmission apparatus of this embodiment is provided with a DIF encoder 17 connected to the multiplexer 16, and a memory 18 connected to the DIF encoder 17. The DIF encoder 17 performs packetizing, insertion of ID, arrangement of DIF packets into a predetermined line, and the like for outputting the multiplexed DIF data 68 into a digital interface. The arrangement of the DIF packets is performed on a line-by-line basis in four transmission areas provided in the memory 18 (a detail description thereon is below).

The aforementioned memories 11 to 14, memory controller 15, multiplexer 16, DIF encoder 17, and memory 18 configure a multiplexing means for dividing one frame of a television signal into n transmission areas on the line-by-line basis, and multiplexing digital data of n channels reproduced by the reproduction means on the n corresponding transmission areas on the line-by-line basis.

Further, the DIF encoder 17 is successively connected to a driver 19 constituting a transmission means, and an output terminal 20. The driver 19 subjects the DIF packets input from the DIF encoder 17 to coding (channel coding) for data transmission, and outputs them to the output terminal 20. The output terminal 20 is connected to a transmission path (not shown) such as coaxial cable, and the multiplexed data are sequentially transmitted therethrough.

In the below, a concrete description will now be given to the operation of the digital data transmission apparatus of this embodiment with reference to FIG. 1. It is noted that a description is omitted on the processing of VAUX data, AAUX data, and sub-code data multiplexed on the DIF data 68.

First, the reproduced data 51 to 54 are read in parallel from the magnetic tape 100 by the four heads, and once written in the memory 1. Each of the reproduced data 51 to 54 is data for one frame, and reproduced from the magnetic tape 100 with being divided into units of its track. As a result of this, in the memory 1, rearrangement processing into the data on the frame-by-frame basis is performed with the control of the memory controller 2.

Next, the reproduced data 55 to 58 are read in parallel from the memory 1 to the reproduced data processors 3 to 6, respectively. Each of the reproduced data 55 to 58 is data on the frame-by-frame basis. Also, the order of the reproduced data 55 to 58 on a time axis is, assuming that k is a natural number, the k, (k+1), (k+2), and (k+3) th frames, respectively.

Then, in the reproduced data processors 3 to 6, the demodulation processing of the respective reproduced data 55 to 58 is performed, individually. Thereafter, the reproduced data processors 3 to 6 output the demodulated data to the error correction decoders 7 to 10 each connected thereto, respectively. Subsequently, in the error correction decoders 7 to 10, the respective input data are individually subjected to the error correction decoding processing based on each parity for error correction added at the time of recording, and written in the memories 11 to 14 as the DIF data 59 to 62, respectively.

Next, in the memories 11 to 14 and the multiplexer 16, the multiplex-processing is performed for multiplexing the DIF data 59 to 62 of four channels input in parallel on one processing system on the channel-by-channel basis.

A concrete description will be given to the multiplex-processing of the DIF data 59 to 62 with reference to FIG. 2. It is noted that, in the following description, the systems for performing processing with the memories 11, 12, 13 and 14, respectively, are defined as channel 1, channel 2, channel 3, and channel 4, in this order.

Figure 2:
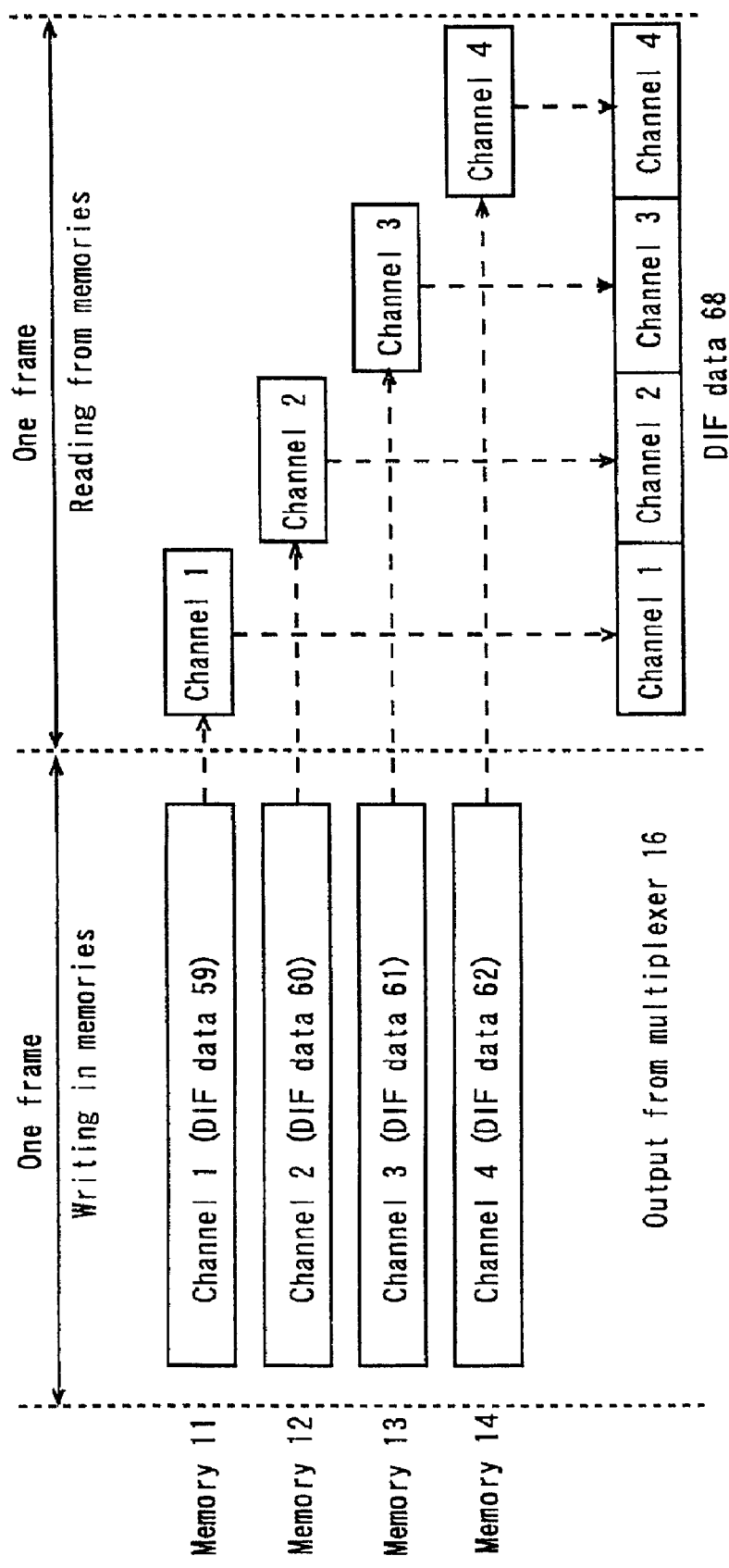
FIG. 2 is a timing chart showing the operation of multiplexing DIF data on a channel-by-channel basis in a multiplexer shown in FIG. 1.

FIG. 2 is a timing chart showing the operation of multiplexing DIF data on a channel-by-channel basis in a multiplexer shown in FIG. 1.

In FIG. 2, the DIF data 59 to 62 for one frame are written into the corresponding memories 11 to 14, respectively, at the same timing based on the write control signal 63 (FIG. 1) from the memory controller 15 (FIG. 1). The DIF data 59 to 62 are required to be multiplexed on the time axis from the channel 1 in order at the time of reading. For this reason, the memory controller 15 first reads the DIF data 59 for one frame of the channel 1 from the memory 1. Thereafter, the memory controller 15 reads the DIF data 60 to 62 for one frame from the memories 12 to 14 in the order of channel 2, channel 3, and channel 4, respectively. Accordingly, the memory controller 15 outputs the write control signal 63 with respect to all of the memories 11 to 14 at the same timing. On the other hand, the memory controller 15 outputs read control signals 64 to 67 (FIG. 1) for the memories 11 to 14 in accordance with their corresponding read-out positions of the DIF data 59 to 62 of the respective channels 1 to 4, respectively.

In the multiplexer 16, the DIF data 59 to 62 each for one frame sequentially read from the respective memories 11 to 14 are multiplexed on a time axis for each of the channels 1 to 4, to be output as the DIF data 68. It is noted that, the multiplex-processing is time axis compression processing for performing compression on a time axis with respect to the DIF data 59 to 62 of the respective channels 1 to 4. Accordingly, the read operation from the memories 11 to 14 is performed at 4 times the frequency of the write operation.

The DIF data 68 multiplexed by the multiplexer 16 is input in the DIF encoder 17 (FIG. 1). The DIF encoder 17 packetizes the input DIF data 68, and adds a packet header which is identifying information, a parity for error correction and the like thereto. Further, the DIF encoder 17 arranges the DIF packets of the respective channels 1 to 4 in predetermined lines on the SDI standard for four transmission areas provided in the memory 18 (FIG. 1).

A concrete description will now be given to the configuration of the DIF packet generated by the DIF encoder 17 with reference to FIG. 3.

Figure 3:
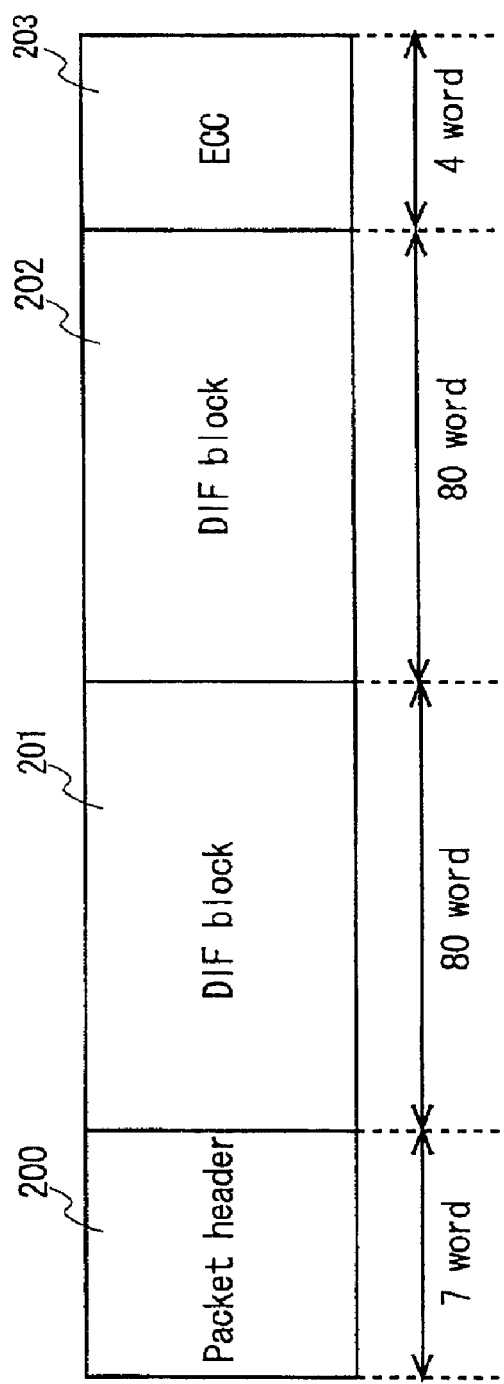
FIG. 3 is an explanatory diagram showing a configuration of a DIF packet generated by a DIF encoder shown in FIG. 1.

FIG. 3 is an explanatory diagram showing a configuration of a DIF packet generated by a DIF encoder shown in FIG. 1.

As shown in FIG. 3, the DIF packet which is a packet for transmitting the DIF data 68 is comprised of a packet header 200, two DIF blocks 201 and 202, and a parity for error correction 203 (in the figure, abbreviated as "ECC"). Each of the DIF blocks 201 and 202 has 80 words of data amount, and is a block of the minimum unit which configures the multiplexed DIF data 68 from the multiplexer 16 (FIG. 1). The DIF encoder 17 adds the packet header 200 comprised of 7 words, and the parity for error correction 203 comprised of 4 words to the two generated DIF blocks 201 and 202. This generates one DIF packet. After being packetized by the DIF encoder 17 (FIG. 1) in this manner, the DIF packet is multiplexed in the predetermined line in the active video period of one frame on the SDI standard. Subsequently, coding for data transmission is performed by the driver 19 (FIG. 1). Then, the data in which the DIF packets are multiplex on the SDI standard are output from the output terminal 20 (FIG. 1) to the outside. In the following description, the data in which digital data including video data compressed on the SDI standard is referred to as Compressed SDI data.

It is noted that, in the aforementioned description, the configuration was described whereby the DIF encoder 17 performs the packetizing processing for generating the DIF packet. However, the configuration can be properly adopted whereby packetizing is performed using the memories 11 to 14 for multiplexing, and the packet header 200 and parity for error correction 203 are added in the DIF encoder 17.

A concrete description will now be given to a transmission method for arranging and transmitting DIF packets for four channels in the active video period of one frame on the SDI standard with reference to FIG. 4.

Figure 4:
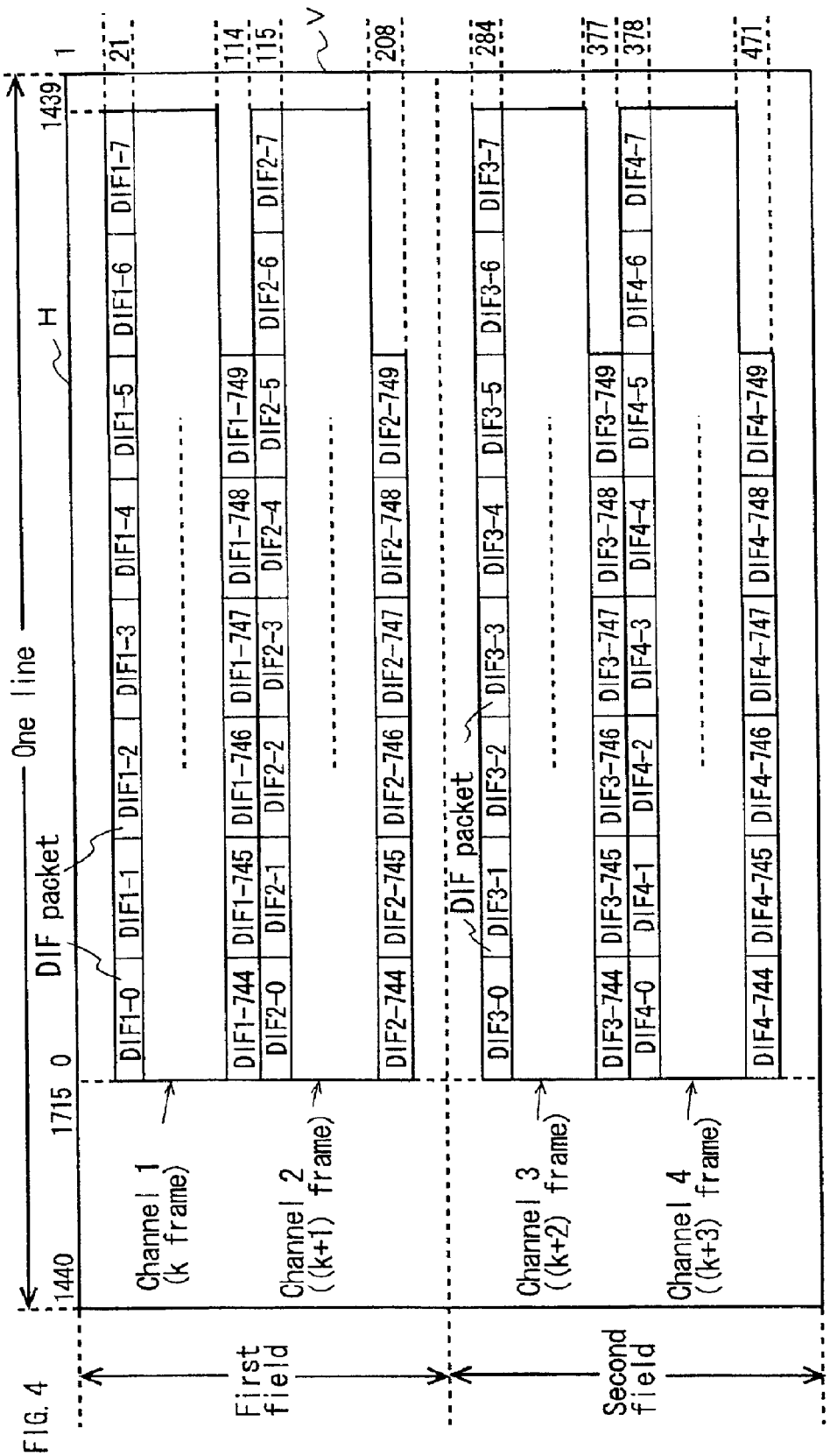
FIG. 4 is an explanatory diagram showing a method for arranging DIF packets of four channels in an active video period of one frame prescribed in the SDI standard in the digital data transmission apparatus shown in FIG. 1.

FIG. 4 is an explanatory diagram showing a method for arranging DIF packets of four channels in an active video period of one frame prescribed in the SDI standard in the digital data transmission apparatus shown in FIG. 1.

As shown in FIG. 4, the one frame in the television signal prescribed in the SDI standard is divided into the four transmission areas corresponding to the respective four channels 1 to 4 on the line-by-line basis. That is, a predetermined number of lines, for example, 94 lines are assigned to each transmission area of the channels 1 to 4.

Concretely, as shown in the same figure, the DIF packets of the channel 1 are arranged between the 21st line and the 114th line, and thus multiplexed. Similarly, the DIF packets of the channel 2, the DIF packets of the channel 3, and the DIF packets of the channel 4 are arranged between the 115th line and 208th line, between the 284th line and the 377th line, and between the 378th line and the 471st line, respectively, and thus multiplexed.

Figure 14:
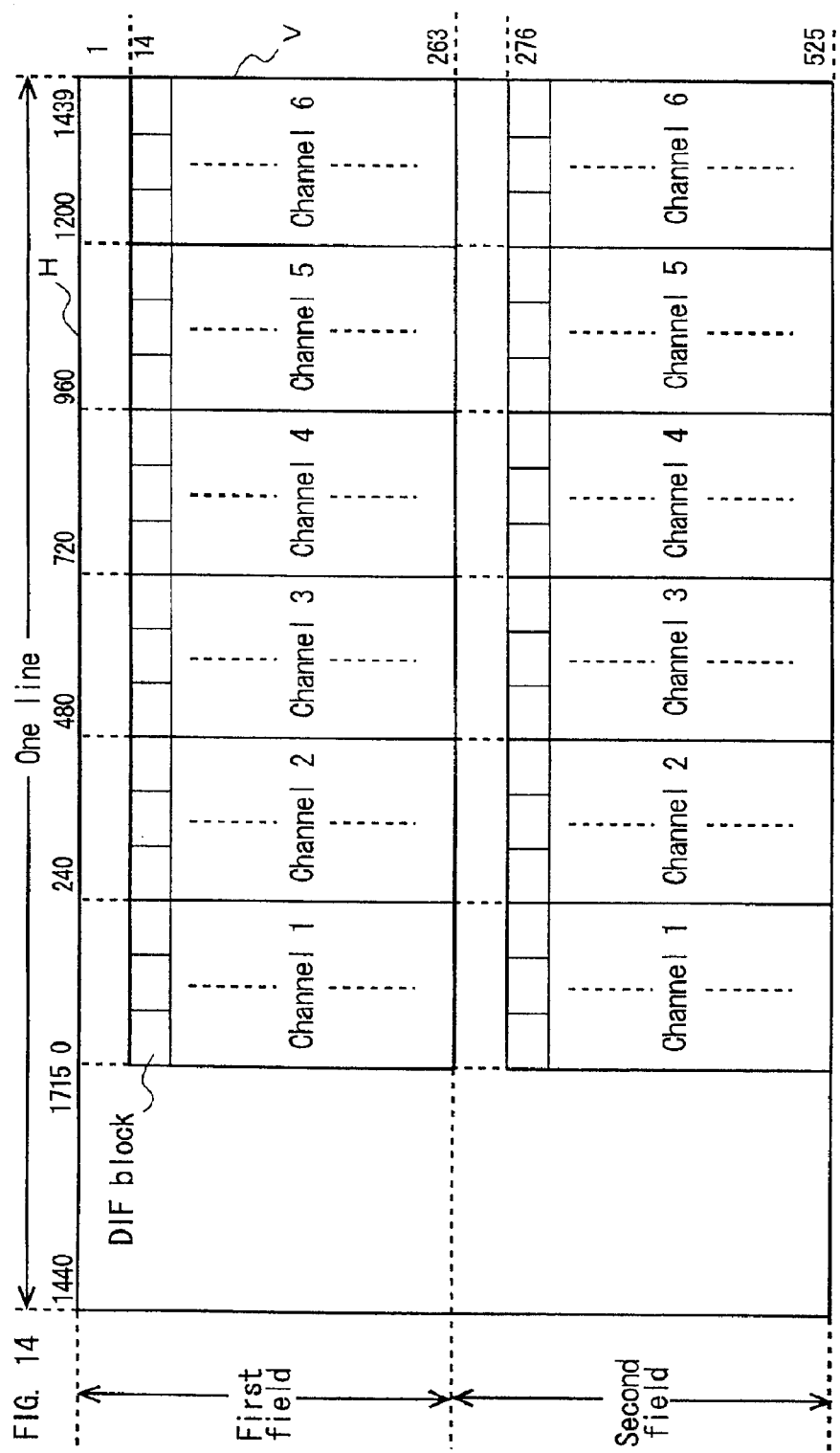
FIG. 14 is an explanatory diagram showing a method for multiplexing and transmitting digital data of 6 channels using the SDI standard in a conventional digital data transmission method.

The number of DIF packets of each of the channels 1 to 4 is 750 packets per frame. That is, the DIF data for one frame is generated into 750 DIF packets by the DIF encoder 17 (FIG. 1). These DIF packets are multiplexed in groups of 8 packets on the line-by-line basis, and sequentially transmitted on the predetermined line-by-line basis. The arrangement of these DIF packets is performed by writing data into the four transmission areas set in the memory 18 (FIG. 1) corresponding to the respective channels 1 to 4. Thus, the DIF packets of the respective channels 1 to 4 undergo time-division multiplexing on the line-by-line basis, and transmitted in the same order as that recorded in the magnetic tape. Therefore, even in the case where the compressed SDI data output from the digital data transmission apparatus of this embodiment are received at an apparatus on the receiving side of the transmission path such as server apparatus, and the compressed SDI data are recorded in hard disk and the like, it becomes possible to perform sequential recording in hard disk in the order received. Consequently, in the digital data transmission apparatus of this embodiment, processing such as rearranging of data is not required as in the conventional example described with reference to FIG. 14, which also eliminates the need for a memory and the like for the rearrangement processing.

It is noted that the lines for multiplexing the DIF packets of the respective channels 1 to 4 are not limited to the ones shown in FIG. 4, but can be freely set in accordance with applications. For example, the configuration can be properly adopted in which the channels 2 and 4 are multiplexed with several lines being interposed after the channels 1 and 3, respectively.

As described above, in the digital data transmission apparatus of this embodiment, when the data of a plurality of channels are comprised of data of consecutive frames of the same sequence, the data of each channel can be multiplexed on the line-by-line basis in chronological order reproduced, and transmitted.

It is noted that, in the digital data transmission apparatus of this embodiment, a case where high-speed transmission is performed at the 4 times normal speed is taken as illustration. However, it is possible to further increase the number of channels, thereby performing much higher-speed transmission.

<<Second Embodiment>>

Figure 5:
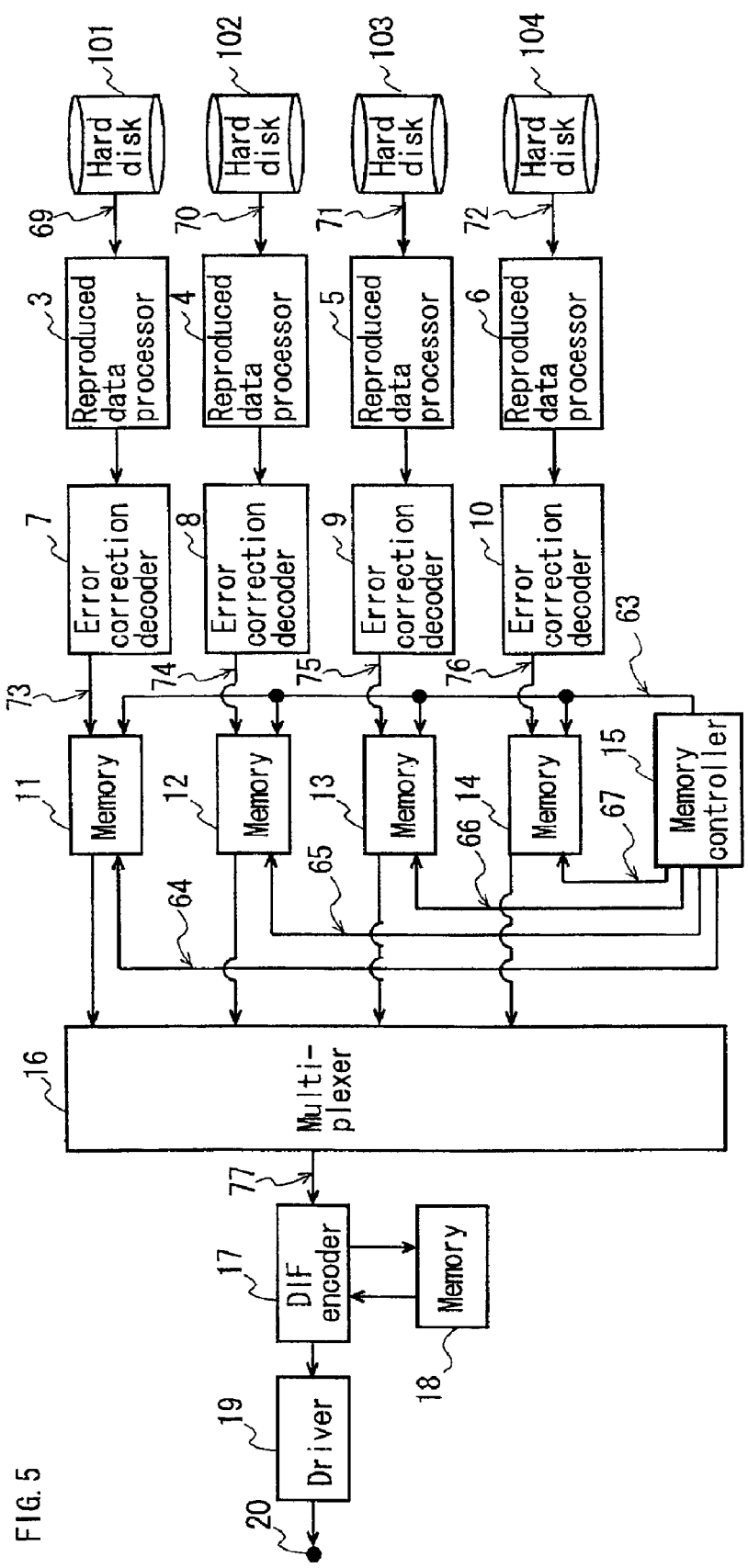
FIG. 5 is a block diagram showing a configuration of a digital data transmission apparatus in a second embodiment of the present invention.

FIG. 5 is a block diagram showing a configuration of a digital data transmission apparatus in a second embodiment of the present invention. In this embodiment, in a configuration of the digital data transmission apparatus, the configuration is adopted in which data of four different materials are converted into compressed SDI data, thereby to be transmitted. The other elements and portions are similar to those of the first embodiment, and therefore superposed descriptions on the similar points are omitted.

As shown in FIG. 5, in the digital data transmission apparatus of this embodiment, the reproduced data processors 3 to 6 are connected to four hard disks 101, 102, 103, and 104, respectively. The hard disks 101 to 104 record data 69, 70, 71, and 72 of mutually different sequences 1, 2, 3, and 4, respectively. The hard disks 101 to 104 simultaneously reproduce data 69 to 72, and output them to the reproduced data processors 3 to 6, respectively.

The reproduced data processors 3 to 6 perform the demodulation processing of data for the respective input data 69 to 72, and output them to the error correction decoders 7 to 10, respectively. Each of the error correction decoders 7 to 10 performs the error correction decoding processing of input data based on the parity for error correction added at the time of recording in the same manner as in the first embodiment. Thereafter, the error correction decoders 7 to 10 output the above-described sequences 1 to 4 as DIF data 73, 74, 75, and 76 of the respective channels 1 to 4 to memories 11 to 14, respectively. It is noted that, in the digital data transmission apparatus of this embodiment, the above-described reproduction means is comprised of the reproduced data processors 3 to 6, and the error correction decoders 7 to 10.

The subsequent processing is the same as that described in the first embodiment. The DIF data 73 to 76 are multiplexed on the time axis in one processing system for each of the channels 1 to 4, and output as DIF data 77 from the multiplexer 16 to the DIF encoder 17. Thereafter, they are converted to packets by the DIF encoder 17, and then multiplexed in the active video period of one frame of the SDI standard using transmission areas in the memory 18. Then, they are output as the compressed SDI data through the driver 19 from the output terminal 20 to the outside.

A concrete description will now be given to the transmission method with the digital data transmission apparatus of this embodiment with reference to FIG. 6.

Figure 6:
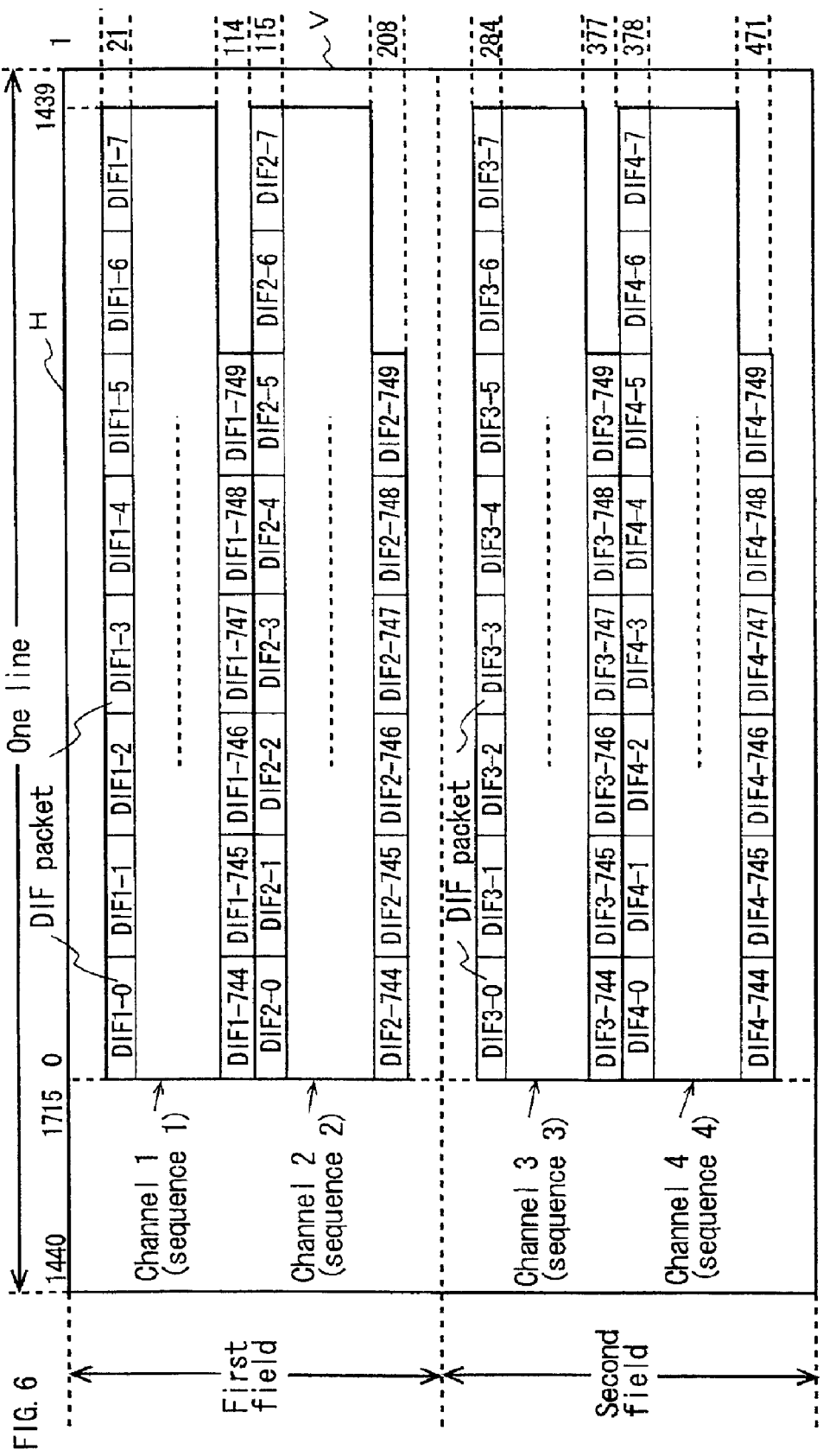
FIG. 6 is an explanatory diagram showing a method for arranging the DIF packets of four channels in the active video period of one frame prescribed in the SDI standard in the digital data transmission apparatus shown in FIG. 5.

FIG. 6 is an explanatory diagram showing a method for arranging the DIF packets of four channels in the active video period of one frame prescribed in the SDI standard in the digital data transmission apparatus shown in FIG. 5.

In the transmission method of the first embodiment shown in FIG. 4, there have been arranged DIF packets of four consecutive frames of the same sequence in the active video period of one frame. In contrast, in the transmission method of this-embodiment, as shown in FIG. 6, there are arranged DIF packets of four channels of different sequences 1 to 4. However, the arrangement of the DIF packets in each of the channels 1 to 4 is entirely the same as that in the first embodiment shown in FIG. 4. Thus, the DIF packets of the respective channels 1 to 4 are arranged on the line-by-line basis in the transmission areas in the memory 18 (FIG. 5), and transmitted. Therefore, in the digital data transmission apparatus of this embodiment, even in the case where data of different sequences are transmitted simultaneously in multi-channel, they can be multiplexed and distributed as the DIF data of each channel on the field-by-field basis and on the line-by-line basis.

<<Third Embodiment>>

Figure 7:
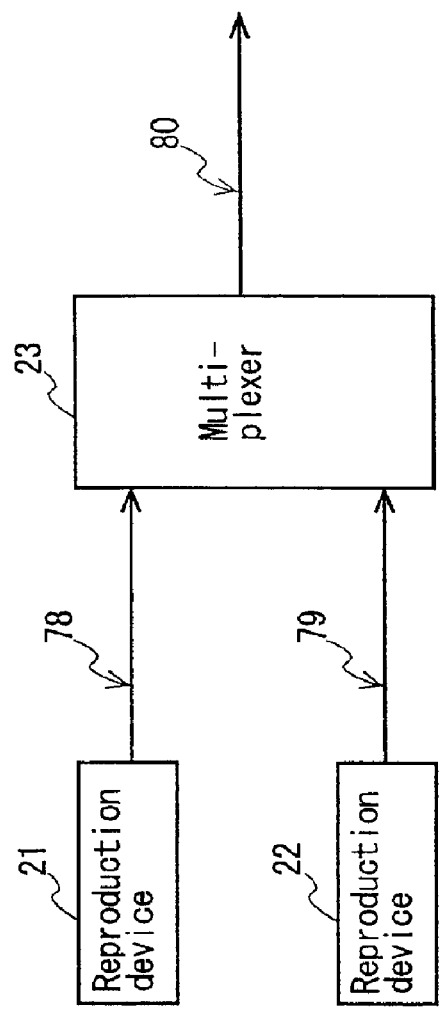
FIG. 7 is a block diagram showing a configuration of a digital data transmission apparatus in a third embodiment of the present invention.

FIG. 7 is a block diagram showing a configuration of a digital data transmission apparatus in a third embodiment of the present invention. In this embodiment, in the configuration of the digital data transmission apparatus, the configuration is adopted in which compressed SDI data from a plurality of reproducing devices are multiplexed and transmitted. The other elements and portions are similar to those of the first embodiment, and therefore superposed descriptions on the similar points are omitted.

As shown in FIG. 7, the digital data transmission apparatus of this embodiment includes two reproducing devices 21 and 22, and a multiplexer 23 connected to the reproducing devices 21 and 22. The reproducing devices 21 and 22 reproduce compressed SDI data 78 and 79, and output them to the multiplexer 23, respectively. The multiplexer 23 selects the input compressed SDI data 78 and 79 based on the control from the outside control device (not shown), and outputs them to the outside as compressed SDI data 80 of one channel.

A concrete description will now be given to a transmission method with the digital data transmission apparatus of this embodiment with reference to FIG. 8.

Figure 8:
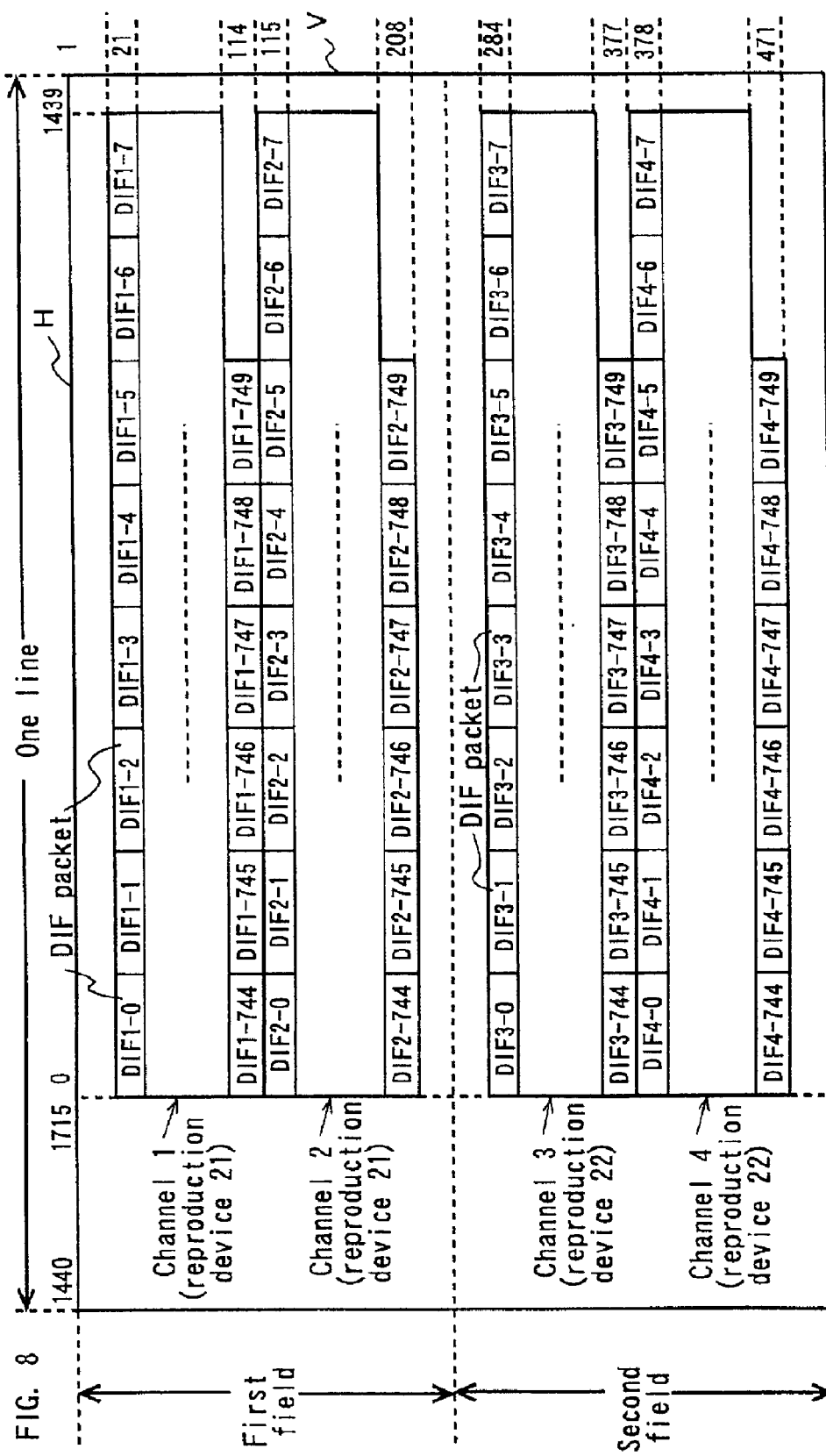
FIG. 8 is an explanatory diagram showing a method for arranging the DIF packets of two different compressed SDI data in the active video period of one frame prescribed in the SDI standard in the digital data transmission apparatus shown in FIG. 7.

FIG. 8 is an explanatory diagram showing a method for arranging the DIF packets of two different compressed SDI data in the active video period of one frame prescribed in the SDI standard in the digital data transmission apparatus shown in FIG. 7.

As shown in FIG. 8, in the active video period of the first field, there are arranged and multiplexed DIF packets obtained by dividing the compressed SDI data 78 from the reproducing device 21 into units of packet. The multiplexer 23 selects and outputs these DIF packets as the compressed SDI data 80 of the channels 1 and 2. Also, in the active video period of the second field, there are arranged and multiplexed DIF packets obtained by dividing the compressed SDI data 79 from the reproducing device 22 into units of packet. The multiplexer 23 selects and outputs these DIF packets as the compressed SDI data 80 of the channels 3 and 4.

As described above, in the digital data transmission apparatus of this embodiment, the compressed SDI data from different reproducing devices and the DIF packets of the compressed SDI data are arranged and multiplexed on the channel-by-channel basis and on the line-by-line basis, respectively. With this configuration, in the digital data transmission apparatus of this embodiment, it becomes possible to multiplex and assign digital data onto the transmission path on the line-by-line basis and on the field-by-field basis. Further, in the case where only a predetermined channel of a plurality of channels is received by an apparatus on the receiving side, it is possible to extract the compressed SDI data of the required channel by specify the lines to be received.

<<Fourth Embodiment>>

Figure 9:
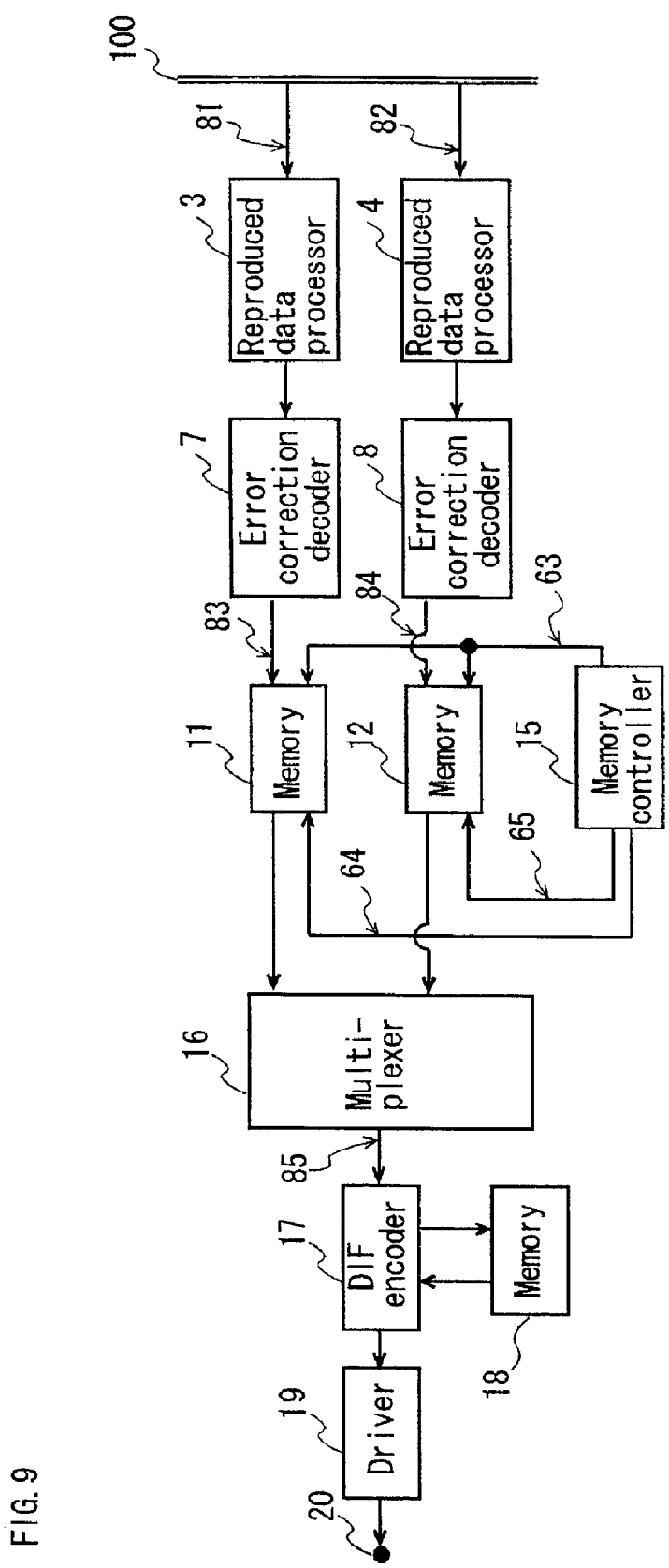
FIG. 9 is a block diagram showing a configuration of a digital data transmission apparatus in a fourth embodiment of the present invention.

FIG. 9 is a block diagram showing a configuration of a digital data transmission apparatus in a fourth embodiment of the present invention. In this embodiment, in the configuration of the digital data transmission apparatus, such the configuration is adopted that in which compressed SDI data is transmitted corresponding to two different data rates. The other elements and portions are similar to those of the first embodiment, and therefore superposed descriptions on the similar points are omitted. It is noted that, in the following description, the two data rates of 25 Mbps and 50 Mbps prescribed in the DV format are used to give a description for facilitating the comparison with the conventional example described with reference to FIGS. 15 and 16. Also, it is assumed that the 25 Mbps which is the same data rate as that in each of the foregoing embodiments is a first data rate, while the 50 Mbps which is the data rate twice thereof is a second data rate.

As shown in FIG. 9, the digital data transmission apparatus of this embodiment includes the reproduced data processors 3 and 4 for performing demodulation processing of reproduced data 81 and 82 simultaneously reproduced from the magnetic tape 100 by two heads (not shown), respectively, and the error correction decoders 7 and 8 individually connected to the respective reproduced data processors 3 and 4 and for performing the error correction decoding processing of the input reproduced data. The error correction decoders 7 and 8, in the same manner as those in the first embodiment, perform the error correction decoding processing of the reproduced data input from the reproduced data processors 3 and 4 based on the corresponding parities added at the time of recording, respectively, and output DIF data 83 and 84 each including compressed video data, audio data, and sub-code data to the memories 11 and 12, respectively. It is noted that, in the digital data transmission apparatus of this embodiment, the above-described reproduction means is comprised of the reproduced data processors 3 and 4, and the error correction decoders 7 and 8.

In the digital data transmission apparatus of this embodiment, the memories 11 and 12 and the multiplexer 16 output DIF data 85 obtained by multiplexing the DIF data 83 and 84 of the respective two sub-channels A and B in parallel input from the respective error correction decoders 7 and 8 onto one processing system to the DIF encoder 17.

Below, a concrete description will now be given to the operation of the digital data transmission apparatus of this embodiment with reference to FIG. 9.

First, the reproduced data 81 and 82 are read in parallel from the magnetic tape 100 by the two heads, and output to the reproduced data processors 3 and 4, respectively.

Next, in the reproduced data processors 3 and 4, there is individually performed the demodulation processing of the respective reproduced data 81 and 82. Thereafter, the reproduced data processors 3 and 4 output the demodulated data to the respective error correction decoders 7 and 8 respectively connected thereto. Subsequently, in the error correction decoders 7 and 8, the error correction decoding processing of the input data are performed based on each parity for error correction added at the time of recording, and written as DIF data 83 and 84 to the memories 11 and 12, respectively.

Next, in the memories 11 and 12 and the multiplexer 16, there is performed a multiplex-processing for multiplexing the DIF data 83 and 84 of the two respective sub-channels A and B input in parallel onto one processing system.

A concrete description will now be given to the multiplex-processing of the DIF data 83 and 84 with reference to FIG. 10.

Figure 10:
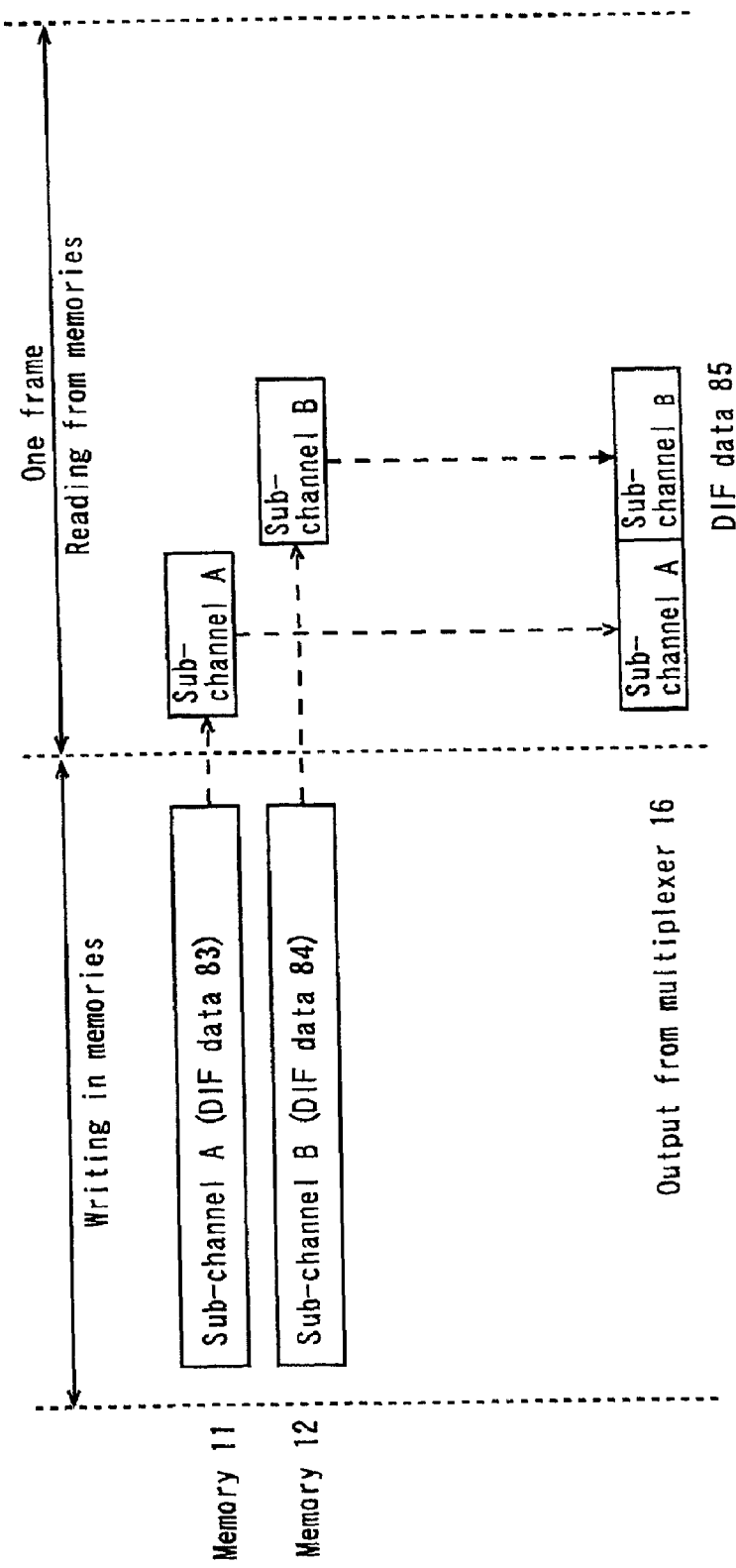
FIG. 10 is a timing chart showing the operation of multiplexing the DIF data on a sub-channel-by-sub-channel basis in a multiplexer shown in FIG. 9.

FIG. 10 is a timing chart showing the operation of multiplexing the DIF data on a sub-channel-by-sub-channel basis in the multiplexer shown in FIG. 9.

In FIG. 10, the DIF data 83 and 84 each for one frame are written into the corresponding memories 11 and 12 at the same timing based on the write control signal 63 (FIG. 9) from the memory controller 15 (FIG. 9), respectively. The DIF data 83 and 84 are required to be multiplexed on the time axis in the order of sub-channels A and B at the time of reading. Therefore, the memory controller 15 first reads the DIF data 83 for one frame of the sub-channel A from the memory 11, and then reads the DIF data 84 for one frame of the sub-channel B from the memory 12. Accordingly, the memory controller 15 outputs the write control signal 63 with respect to the memories 11 and 12 at the same timing. On the other hand, the memory controller 15 outputs read control signals 64 and 65 (FIG. 9) for the memories 11 and 12 in accordance with each read-out position of the DIF data 83 and 84 of the respective sub-channels A and B, respectively.

In the multiplexer 16, the DIF data 83 and 84 each for one frame sequentially read from the respective memories 11 and 12 are multiplexed for each of the sub-channels A and B on the time axis, to be output as DIF data 85 of one system. It is noted that, the multiplex-processing is time axis compression processing for performing compression on the time axis with respect to the DIF data 83 and 84 of the respective sub-channels A and B. Accordingly, the read operation from the memories 11 and 12 is performed at frequency quadruple that of the write operation.

The subsequent processing is the same as those described in the first and second embodiments. The DIF data 85 multiplexed onto one processing system is output from the multiplexer 16 to the DIF encoder 17 (FIG. 9). Thereafter, they are converted into packets by the DIF encoder 17, and multiplexed in the active video period of one frame of the SDI standard using transmission areas in the memory 18 (FIG. 9). Then, they are output as the compressed SDI data through the driver 19 (FIG. 9) from the output terminal 20 (FIG. 9) to the outside.

A concrete description will now be given to the transmission method with the digital data transmission apparatus of this embodiment with reference to FIG. 11.

Figure 11:
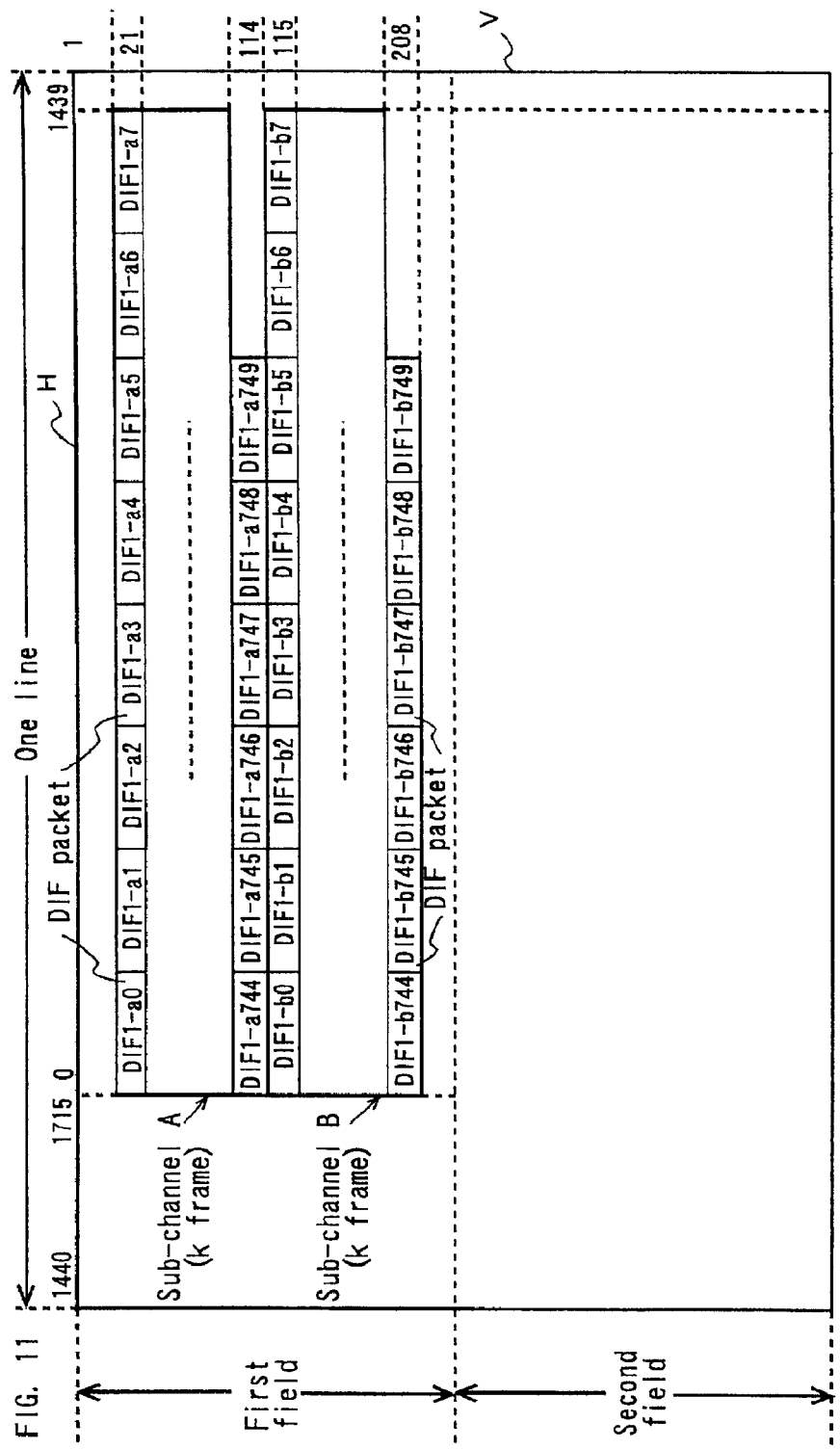
FIG. 11 is an explanatory diagram showing a method for arranging the DIF packets of two sub-channels in the active video period of one frame prescribed in the SDI standard in the digital data transmission apparatus shown in FIG. 9.

FIG. 11 is an explanatory diagram showing a method for arranging the DIF packets of two sub-channels in the active video period of one frame prescribed in the SDI standard in the digital data transmission apparatus shown in FIG. 9.

As shown in FIG. 11, in each of the sub-channels A and B, the number of DIF packets thereof is 750 packets per frame in the same manner as in each of the aforementioned embodiment. Also, in the case of the 50 Mbps mode which is the second data rate, the number of DIF packets is 1500 packets per frame.

These DIF packets are arranged in groups of 8 packets on the line-by-line basis in the same manner as in other embodiments. For this reason, the DIF packets of the sub-channel A are multiplexed between the 21st line and the 114th line, while the DIF packets of the sub-channel B are multiplexed between the 115th line and the 208th line, thus to be transmitted, respectively. That is, the DIF packets of the respective sub-channels A and B are multiplexed on the time axis on a sub-channel-by-sub-channel basis, and on the line-by-line basis, to be transmitted as the compressed SDI data 85.

A comparison will now be given between the arrangement of DIF packets in the sub-channels shown in FIG. 11 and the arrangement of DIF packets in the channels in each of the first and second embodiments shown in FIGS. 4 and 6, respectively. Apparent from the comparison results, DIF packets are arranged in entirely the same lines between the sub-channel A and the channel 1, and between the sub-channel B and the channel 2. In other words, in the digital data transmission apparatus of this embodiment, in the case where the data to be transmitted are in the 50 Mbps mode, it becomes possible to process the data by dividing them into two sub-channels A and B corresponding to one channel in the case of the 25 Mbps mode. This enables commonality of multiplexing into compressed SDI data, and packetizing processing between the 50 Mbps mode and the 25 Mbps mode.

Figure 12:
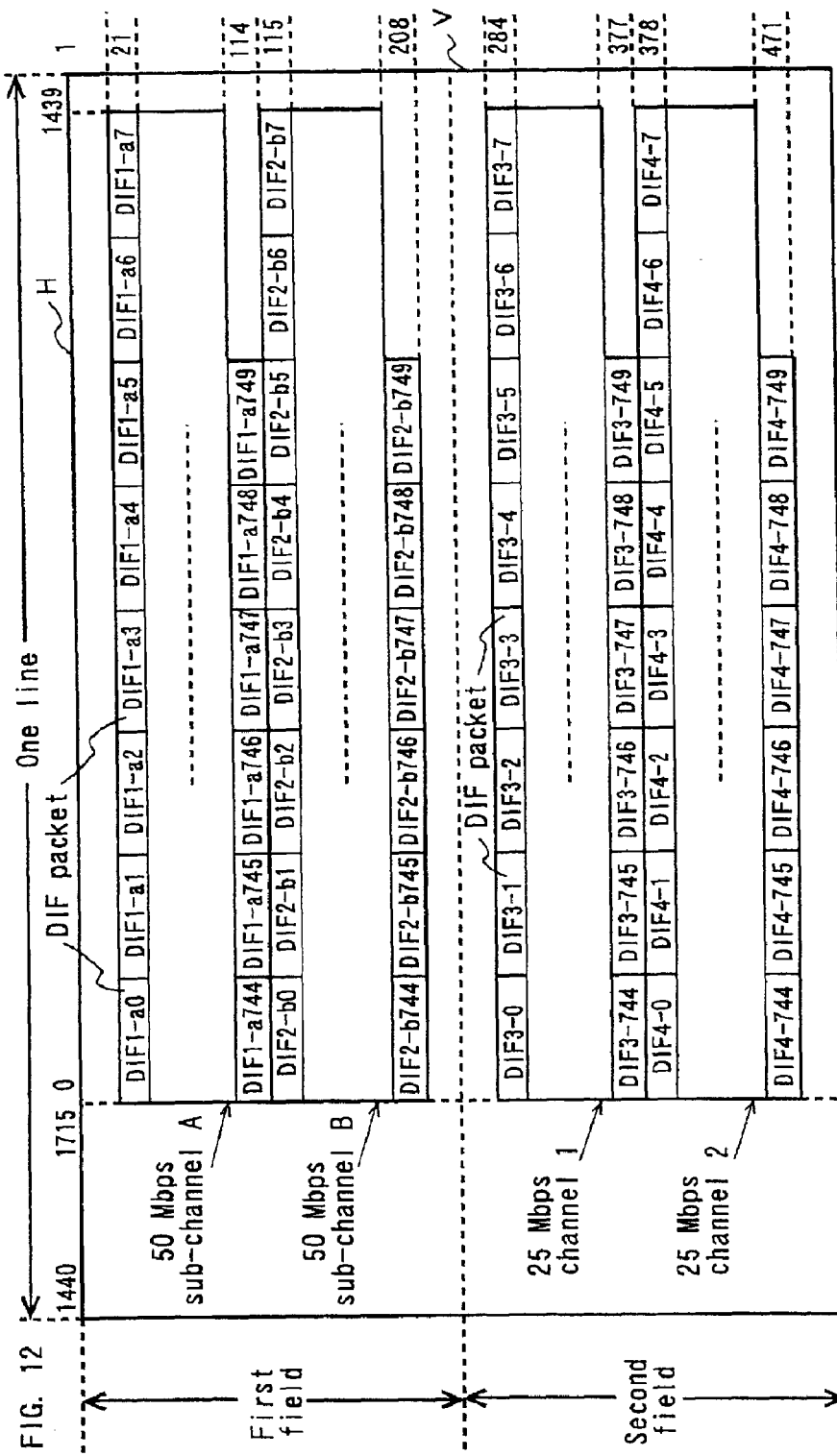
FIG. 12 is an explanatory diagram showing a method for arranging the DIF packets of different data rates in the active video period of one frame prescribed in the SDI standard in the digital data transmission apparatus shown in FIG. 9.
Figure 13:
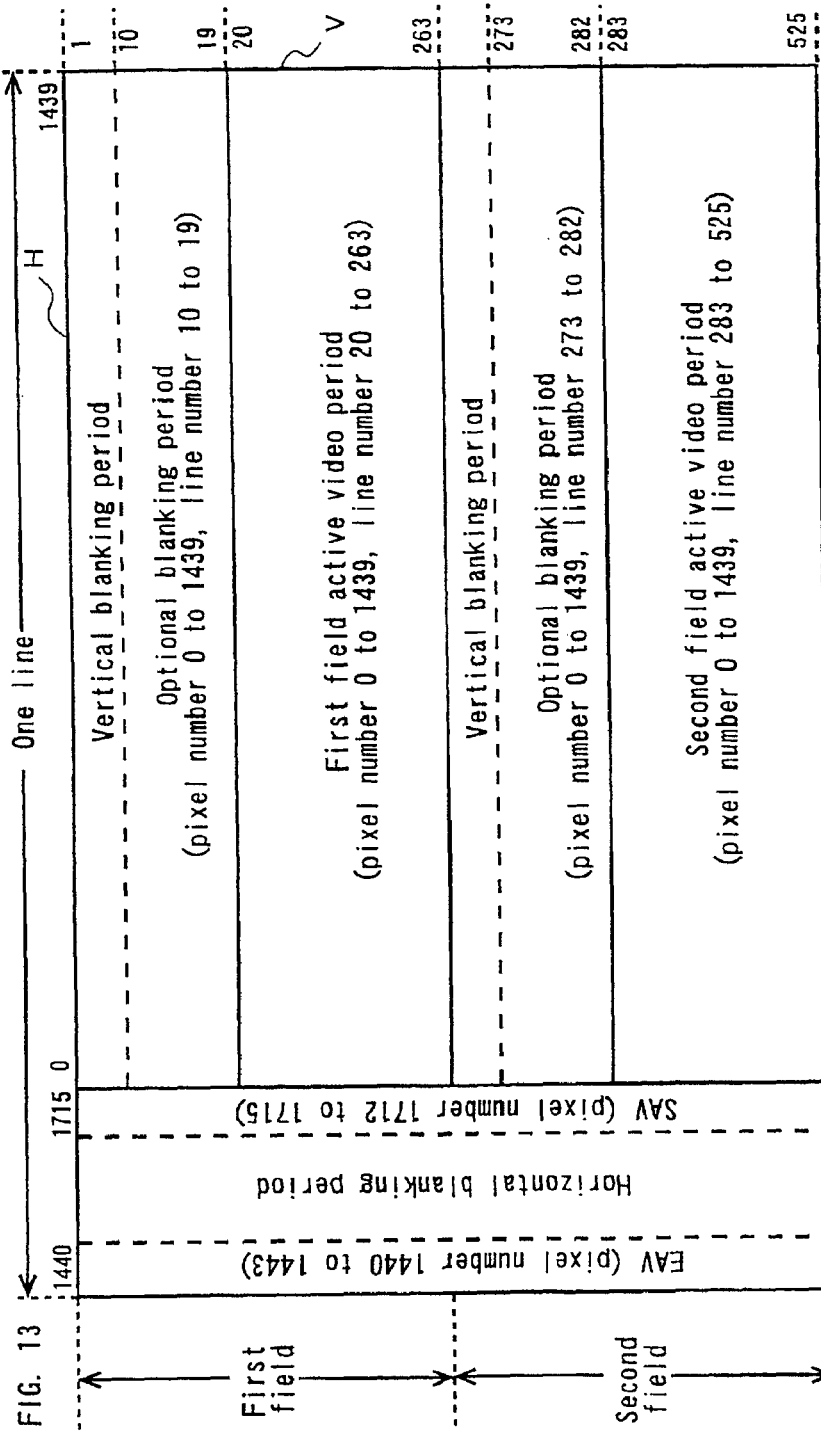
FIG. 13 is an explanatory diagram showing a configuration of one frame in the SDI standard.

Therefore, for example, as shown in FIG. 12, it can be performed easily that data of one channel of the 50 Mbps mode are multiplexed in the transmission area of the first field, while data of two channels of the 25 Mbps mode are multiplexed in the transmission area of the second field.

As described above, in the digital data transmission apparatus of this embodiment, even in the case where digital data to be transmitted have different data rates such as the 50 Mbps mode and the 25 Mbps mode, the DIF packets in the transmission area are multiplexed on the line-by-line basis with the same arrangement. Consequently, in the digital data transmission apparatus of this embodiment, data transmission can be performed without expanding the circuit size of the multiplexer. This can facilitate the data processing in an apparatus on the receiving side of the transmission path.

It is noted that, in the aforementioned first to fourth embodiments, a description has been given to the digital data transmission apparatus handling data compressed by the DV format. However, the DV format is not an exclusive example, and hence data compressed by other bit rate reduction techniques can be properly adopted. For example, the data compressed based on the MPEG (Moving Picture Experts Group) standard can also be transmitted in the same manner.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

Industrial Applicability

The present invention is applicable to a digital data transmission apparatus for multiplexing and transmitting digital data including video signal and audio signal, and the transmission method thereof. It is used particularly for a digital data transmission apparatus for multiplexing and transmitting digital data in the active video period of the television signal, and the transmission method thereof.

What is claimed is:

1. A digital data transmission apparatus for multiplexing and transmitting compressed digital video data of n channels, within active video periods of one frame of a television signal, n being an integer of 2 or more, said digital data transmission apparatus comprising:
    a reproduction means for reproducing the digital video data of said channels from a recording medium,
    a multiplexing means for:
        (1) dividing said active video periods of one frame of the television signal into n transmission areas, each of the n transmission areas comprising m consecutive lines, m being a positive integer,
        (2) packetizing the reproduced compressed digital video data of each of the n channels into a plurality of packets, each of the packets having a packet header including a packet ID and a length of 1/k times the length of one of the m consecutive lines, k being an integer of 2 or more, and
        (3) arranging the packets of the reproduced compressed digital video data of each of said n channels within one of said n transmission areas wherein said m consecutive lines comprise the compressed digital video data of one and only one of said n channels, and
    a transmitting means for transmitting the packets arranged by said multiplexing means within each of the n transmission areas, serially from a top line to a bottom line of each of the transmission areas.

2. A digital data transmission apparatus according to claim 1, wherein the compressed digital video data of each of said n channels is chronologically consecutive data of one sequence.

3. A digital data transmission apparatus according to claim 1, wherein the compressed digital video data of each of said n channels is data of a different sequence from one another.

4. A digital data transmission apparatus according to claim 1, wherein said compressed digital video data are compressed to about a 25 Mbps data rate on a frame-by-frame basis.

5. A digital data transmission method for multiplexing and transmitting compressed digital video data of n channels, n being an integer of 2 or more, within an active video period of one frame of a television signal, said digital data transmission method comprising the steps of:
    dividing said active video period of one frame of the television signal into n transmission areas, each of the n transmission areas comprising m consecutive lines, m being a positive integer, of said one frame of the television signal,
    assembling the compressed digital video data of each of the n channels into a plurality of packets, each of the packets having a packet header including a packet ID and a length of 1/k times the length of one of the m consecutive lines, k being an integer of 2 or more,
    arranging the packets of the compressed digital video data of each of said n channels within one of said a transmission areas wherein said m consecutive lines comprise the compressed digital video data of one and only one of said n channels, and
    transmitting the packets arranged within each of the n transmission areas serially from a top line to a bottom line of each of the transmission areas.

6. A digital data transmission method according to claim 5, wherein the compressed digital video data of each of said n channels is chronologically consecutive data of one sequence.

7. A digital data transmission method according to claim 5, wherein the compressed digital video data of each of said n channels is data of a different sequence from one another.

8. A digital data transmission method according to claim 5, wherein said compressed digital video data are compressed to about a 25 Mbps data rate on a frame-by-frame basis.

* * * * *

UNITED STATES PATENT AND TRADEMARK OFFICE
CERTIFICATE OF CORRECTION

PATENT NO. : 6,865,228 B2
DATED : March 8, 2005
INVENTOR(S) : Hideki Otaka et al.

It is certified that error appears in the above-identified patent and that said Letters Patent is hereby corrected as shown below:

Title page,
Item [54], Title, should read -- DIGITAL DATA TRANSMISSION APPARATUS AND METHOD FOR MULTIPLEXING MULTI-CHANNEL VIDEO DATA WITHIN ACTIVE VIDEO PERIODS --.

Signed and Sealed this

Fifth Day of July, 2005

JON W. DUDAS
*Director of the United States Patent and Trademark Office*